(12) United States Patent
Wei et al.

(10) Patent No.: US 10,645,719 B2
(45) Date of Patent: May 5, 2020

(54) ELECTRONIC DEVICE AND METHOD USED FOR WIRELESS COMMUNICATIONS

(71) Applicant: Sony Corporation, Tokyo (JP)

(72) Inventors: Yuxin Wei, Beijing (CN); Chen Sun, Beijing (CN); Jinhui Chen, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/565,492

(22) PCT Filed: Apr. 15, 2016

(86) PCT No.: PCT/CN2016/079383
§ 371 (c)(1),
(2) Date: Oct. 10, 2017

(87) PCT Pub. No.: WO2016/165646
PCT Pub. Date: Oct. 20, 2016

(65) Prior Publication Data
US 2018/0084568 A1   Mar. 22, 2018

(30) Foreign Application Priority Data

Apr. 17, 2015   (CN) .................. 2015 1 01844663

(51) Int. Cl.
H04W 72/00     (2009.01)
H04W 72/12     (2009.01)
H04W 72/04     (2009.01)
H04W 72/08     (2009.01)
H04W 16/14     (2009.01)

(52) U.S. Cl.
CPC ... *H04W 72/1242* (2013.01); *H04W 72/0413* (2013.01); *H04W 72/085* (2013.01); *H04W 72/1284* (2013.01); *H04W 16/14* (2013.01)

(58) Field of Classification Search
CPC . H04M 2215/32; H04W 72/04; H04W 16/12; H04W 24/00; H04W 4/14
USPC ......... 455/405, 450, 451, 452.1, 452.2, 453, 455/455, 466
See application file for complete search history.

(56) References Cited

U.S. PATENT DOCUMENTS 8,874,124 B2   10/2014 Clegg
9,066,250 B2   6/2015 Kazmi et al.
2012/0051255 A1*  3/2012 Han ..................... H04L 47/30
370/252

(Continued)

FOREIGN PATENT DOCUMENTS

WO    2014/186956 A1   11/2014

OTHER PUBLICATIONS

International Search Report dated Jul. 5, 2016 in PCT/CN2016/079383 filed Apr. 15, 2016.

*Primary Examiner* — Matthew W Genack
(74) *Attorney, Agent, or Firm* — Xsensus LLP

(57) ABSTRACT

An electronic device and method used for wireless communications. The electronic device includes one or more processors, the processors are configured to: determine the data status of a low priority traffic that can be used to uplink transmission; and on the basis of the data status of the low priority traffic, generate a scheduling assistance information used for the scheduler of a base station, the scheduling assistance information is related to the transmission of user equipment on an unauthorized transmission resource.

12 Claims, 14 Drawing Sheets

(56) References Cited

U.S. PATENT DOCUMENTS

| | | | |
|---|---|---|---|
| 2013/0028201 A1* | 1/2013 | Koo | H04W 72/1215 370/329 |
| 2014/0222964 A1* | 8/2014 | Leong | H03M 13/23 709/219 |
| 2015/0009869 A1 | 1/2015 | Clegg | |
| 2015/0009962 A1 | 1/2015 | Clegg | |
| 2016/0007350 A1* | 1/2016 | Xiong | H04W 24/10 370/252 |
| 2016/0081109 A1 | 3/2016 | Li et al. | |
| 2016/0119792 A1* | 4/2016 | Cheng | H04W 52/00 455/454 |

* cited by examiner

| Index | LCID value |
|---|---|
| 00000 | CCCH |
| 00001-01010 | Identification of logical channel |
| 01011-11000 | Reserved |
| 11001 | Expanded power margin report |
| 11010 | Power margin report |
| 11011 | C-RNTI |
| 11100 | Truncated BSR |
| 11101 | Short BSR |
| 11110 | Long BSR |
| 11111 | Filling |

Fig. 18

| Index | LCID value |
|---|---|
| 00000 | CCCH |
| 00001-01010 | Identification of logical channel |
| 01011 | LAA BSR |
| 01100 | Availability of channel |
| 01101-11000 | Reserved |
| 11001 | Expanded power margin report |
| 11010 | Power margin report |
| 11011 | C-RNTI |
| 11100 | Truncated BSR |
| 11101 | Short BSR |
| 11110 | Long BSR |
| 11111 | Filling |

Fig. 19

ELECTRONIC DEVICE AND METHOD USED FOR WIRELESS COMMUNICATIONS

The application claims the priority of Chinese Patent Application No. 201510184663.8, titled "ELECTRONIC DEVICE AND METHOD USED FOR WIRELESS COMMUNICATIONS", filed on Apr. 17, 2015 with the State Intellectual Property Office of People's Republic of China, which is incorporated herein by reference in its entirety.

TECHNICAL FIELD

The present disclosure generally relates to the field of wireless communication, and in particular to an electronic device and a method for wireless communication.

BACKGROUND

With the increasing demand of users for high-speed data transmission, the Long Term Evolution (LTE) technology is undoubtedly one of the most competitive wireless transmission technologies. However, with the increasing demand for data transmission, increasing the transmission bandwidth and improving the spectrum utilization will be the key to improve the overall performance of the system. In this context, the use of unlicensed frequency bands receives more and more attentions from operators, and the unlicensed frequency bands are considered to be used as supplementary for the existing LTE licensed frequency bands to improve the quality of service to the user. Hence, the first problem to be solved is how to use the unlicensed frequency bands and to coexist with other systems in the unlicensed frequency bands. At present, the consensus reached by the industry is that an unlicensed frequency band needs to be used with the assistance of the licensed spectrum to provide service for a terminal by carrier aggregation.

SUMMARY

When a terminal has data to be transmitted, the terminal needs to transmit a scheduling request (SR) to a base station for requesting transmission resources. After that, a buffer status report (BSR) may be transmitted to inform the base station of a data volume of a buffer on the terminal side so that the base station assigns a reasonable transmission resource. However, in a scenario involving a transmission in an unlicensed frequency band such as license assisted access (LAA), for example, the conventional technology has the following problems:

(1) An LAA is very dynamic for the use of an unlicensed spectrum. For the sake of fairness and for avoiding interferences to other systems, the use of the spectrum by the user may be interrupted at any time. Hence, the LAA is only suitable for traffic with a low requirement for communication quality, and is not suitable for real-time and high reliability traffics. However, the information is not contained in the design of the existing SR.

(2) In addition to the buffer status information, other auxiliary information for assisting the decision of the base station to assign resources of the unlicensed spectrum to the user is not taken into account in the existing SR design.

(3) Depending on whether the LAA can operate independently and whether it operates with the licensed spectrum by carrier aggregation, the SR process thereof is different.

A brief overview of embodiments of the present disclosure is given below to provide a basic understanding of certain aspects of the present disclosure. It is to be understood that the following overview is not an exhaustive overview of the present disclosure. It is not intended to determine the critical or important part of the disclosure, nor is it intended to limit the scope of the disclosure. The purpose is merely giving some concepts in a simplified manner as a prelude to the more detailed description of the later discussion.

According to an embodiment, an electronic device for wireless communication includes at least one processor configured to: determine a data status of low priority traffic available for an uplink transmission; and generate, based on the data status of the low priority traffic, scheduling assistance information for a scheduler of a base station, the scheduling assistance information being related to a transmission of a user equipment on an unlicensed transmission resource.

According to another embodiment, a method for wireless communication includes: determining a data status of low priority traffic available for an uplink transmission; and generating, based on the data status of the low priority traffic, scheduling assistance information for a scheduler of a base station, the scheduling assistance information being related to a transmission of a user equipment on an unlicensed transmission resource.

According to yet another embodiment, an electronic device for wireless communication includes at least one processor configured to: assign an unlicensed transmission resource based on scheduling assistance information from a user equipment regarding low priority traffic; and generate scheduling assignment information regarding the unlicensed transmission resource, for transmission of the user equipment.

According to another embodiment, a method for wireless communication includes a step of assigning an unlicensed transmission resource based on scheduling assistance information from a user equipment regarding low priority traffic, and a step of generating scheduling assignment information regarding the unlicensed transmission resource, for transmission of the user equipment.

According to yet another embodiment, a device for terminal side of a wireless communication system includes an acquisition unit, a generation unit and a transmission unit. The acquisition unit is configured to acquire a data volume of low priority traffic to be transmitted in a buffer of a logical channel of the device. The generation unit is configured to include information regarding the data volume into a buffer status report. The transmission unit is configured to transmit the buffer status report to a base station.

According to another embodiment, a wireless communication method used by a device on terminal side includes: acquiring a data volume of low priority traffic to be transmitted in a buffer of a logical channel of the device; including information regarding the data volume into a buffer status report; and transmitting the buffer status report to a base station.

According to yet another embodiment, a device for base station side of a wireless communication system includes a reception unit and a scheduling unit. The reception unit is configured to receive a buffer status report in which information regarding a data volume of low priority traffic to be transmitted on a logical channel of a terminal side device is included. The scheduling unit is configured to assign an uplink transmission resource for the terminal side device based on the information regarding the data volume.

According to another embodiment, a wireless communication method used by a device on base station side includes: receiving a buffer status report in which information regarding a data volume of low priority traffic to be transmitted on a logical channel of a terminal side device is included; and assigning an uplink transmission resource for the terminal side device based on the information regarding the data volume.

BRIEF DESCRIPTION OF THE DRAWINGS

The present disclosure may be better understood by referring to the following description given in conjunction with the accompanying drawings in which same or similar reference numbers are used throughout the drawings to refer to the same or like parts. The accompanying drawings, together with the following detailed description, are included in this specification and form a part of this specification, and are used to further illustrate preferred embodiments of the present disclosure and to explain the principles and advantages of the present disclosure. In the drawings:

FIG. 18 illustrates a table of logical channel identifiers for an uplink shared channel according to the conventional technology;

FIG. 19 illustrates an example of a table of logical channel identifiers corresponding to an embodiment of the present disclosure;

DETAILED DESCRIPTION OF THE EMBODIMENTS

Figure 1:
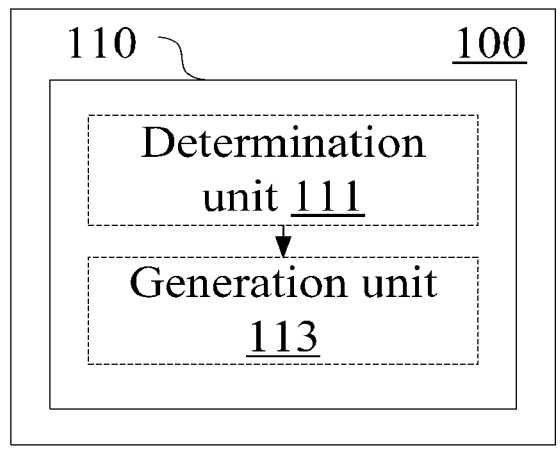
FIG. 1 is a block diagram illustrating a configuration example of an electronic device for wireless communication according to an embodiment of the present disclosure.

Embodiments of the present disclosure are described by referring to the drawings in the following. Elements and features described in one of the drawings or one embodiment of the present disclosure may be combined with elements and features as shown in one or more other drawings or embodiments. It should be noted that, for the purpose of clarity, indication and description of components and processing irrelevant to the present disclosure and known by those skilled in the art are omitted in the drawings and the explanation.

As shown FIG. 1, an electronic device 100 for wireless communication according to an embodiment of the present disclosure includes at least one processor 110 configured to: determine a data status of low priority traffic available for an uplink transmission; and generate, based on the data status of the low priority traffic, scheduling assistance information for a scheduler of a base station. The scheduling assistance information is related to a transmission of a user equipment on an unlicensed transmission resource.

It is to be nodded that, for illustrative purposes, it is shown in FIG. 1 with dashed boxes that the processor 110 includes a determination unit 111 and a generation unit 113. The determination unit 111 may correspond to the function of determining the data status of the low priority traffic available for the uplink transmission, and the generation unit 113 may correspond to the function of generating, based on the data status of the low priority traffic, the scheduling assistance information for the scheduler of the base station. However, it should be understood that, functions of the determination unit 111 and the generation unit 113 may be implemented by the processor 110 as a whole, and are not necessarily implemented by actual discrete components in the processor 110. In addition, although the processor 110 is shown by a single box in FIG. 1, the electronic device 100 may include multiple processors, and functions corresponding to the determination unit 111 and the generation unit 113 may be distributed to the multiple processors so that the multiple processors cooperate to perform these functions. The same applies to other embodiments described below in conjunction with similar block diagrams.

Still with reference to FIG. 1, the low priority traffic includes, for example, traffic having low requirement on quality of service (QoS). For example, the low QoS traffic may include traffic with a high delay tolerance, traffic with a high error rate tolerance, traffic related to non-core content such as advertisement data and the like. In a specific example, the electronic device 100 determines QoS information (for example, a parameter such as QCI, ARP, GBR, AMBR) of a radio bearer of data to be transmitted, and determines which of the traffic to be transmitted is low priority traffic based on a correspondence between the QoS information and a predetermined parameter regarding low QoS (for example, whether a QoS level indicated by QCI falls within a range of low QoS level). For example, a wireless network operator may configure the predetermined parameter regarding low QoS within the network thereof according to requirements. It can be understood that, in different communication systems, evaluation of the traffic priority may be based on different parameters of service quality requirements, and the case of an LTE communication system is given only as an example in the above.

Additionally, the scheduling assistance information may include, for example, the license assisted access scheduling request (LAA-SR) itself, a buffer status report (BSR), a geographical position of a user equipment, an idle condition of candidate channel on an unlicensed transmission resource, a channel quality of a candidate channel on the unlicensed transmission resource, and the like.

The scheduler in the base station determines an uplink resource which can be used for transmission for user equipments served by the base station. For example, the scheduler of the base station determines which user equipments can obtain an uplink resource and which uplink time frequency resources can be obtained, for example, available resource blocks or specific component carriers on a transmission layer such as an uplink shared channel (UL-SCH) in a LTE system. Further, the base station may further control a transmission format selection of a user equipment (the selection of size of transmission block, modulation scheme, antenna mapping and the like). The scheduler according to the present disclosure performs scheduling, for example, user equipment by user equipment. In the existing communication protocol, the scheduler generally performs uplink resource scheduling autonomously based on a general scheduling request (SR) and/or buffer status report of the user equipment. For example, regarding which component carriers are to be scheduled, the user equipment does not make recommendation or requirement for a specific resource or even provide related information.

In order to implement the uplink transmission resource request based on the LAA, the scheduling request LAA-SR for the LAA resource is provided by an example scheme according to the present disclosure. As will be described in conjunction with a specific example process later, transmission objects of the LAA-SR are slightly different depending on whether there is an uplink transmission resource in an LAA cell: if there is no uplink transmission between the LAA cell and a requesting user equipment (for example, there is no resource for transmitting the LAA-SR in LAA frequency bands), then the transmission object of the LAA-SR is a primary cell (a cell corresponding to a primary component carrier (PCC), which may be, for example, a macro cell or a small cell in an licensed frequency band); if there is uplink transmission between the LAA cell and a requesting user equipment (for example, there is resource for transmitting the LAA-SR in LAA frequency bands), then the transmission object of the LAA-SR is the LAA cell. In an example of the present disclosure, the LAA-SR and a common SR have the same signaling structure, for example, are both carried by the PUCCH and transmitted to the primary cell, and it is determined that the SR is an LAA-SR based on that the BSR is transmitted immediately after the LAA-SR. Accordingly, when the base station acquires the SR and the BSR and performs resource scheduling, an unlicensed frequency band is preferentially scheduled for a corresponding user equipment, for example, by activating and scheduling an LAA component carrier. In another example of the present disclosure, the base station pre-configures a dedicated LAA-SR resource for the user equipment (for example, configured through SchedulingRequest-Config in RRC signaling), and the SR being received on a corresponding resource by the base station is considered as a scheduling request for an unlicensed resource. In another example of the present disclosure, all SRs received on the LAA frequency bands by the base station are considered as the resource scheduling request for LAA frequency bands. Thereby, the user equipment can initiatively recommend the required specific resource type.

The SR only indicates that there is uplink data to be transmitted on a terminal, and the amount of resource that needs to be assigned depends on, for example, the buffer data volume in the BSR. According to the BSR specified in the existing standard, a total data volume corresponding to all logical channels in the same logical channel group is reported. As described above, the use of LAA is very dynamic, and thus is more applicable to non-real time traffic (low QoS traffic). However, this type of information is not included in design of the existing BSR.

According to an embodiment, a data status of low priority traffic determined by the processor 110 (the determination unit 111) may include a data volume of low priority traffic available for an uplink transmission in a buffer. Moreover, in a case that the assistance information includes the BSR, the processor 110 (the generation unit 113) may include, in the BSR, indication information for the determined data volume of low priority traffic, for use by a scheduler of the base station. Unlike the indication information on a data volume contained in the BSR in the conventional technology, the indication information according to this embodiment may include only information regarding the size of a buffer of the low priority traffic, and not include information on a size of a buffer of high priority traffic.

Additionally, the processor 110 (the generation unit 113) may further include, in the BSR, identification information of a logical channel and/or a logical channel group to which the low priority traffic belongs, where the logical channel includes, for example, a dedicated traffic channel (DTCH).

In terms of LAA resource scheduling, the amount of corresponding low priority data in a traffic channel is the most important. Hence, the embodiment provides a BSR, which reflects a volume of data with low QoS (which may correspond to a low priority in channel configuration thereof) in a corresponding logical channel such as a dedicated traffic channel DTCH. For example, the BSR has the following format:

| Sub-logical channel ID (2 bits) | Buffer size of low priority traffic on a corresponding logical channel (6 bits) |
|---|---|

The sub-logical channel ID (sub-LCID) (having a length of, for example, 2 bits) represents a logical channel corresponding to the BSR. Since a communication resource on an unlicensed frequency band is unstable, it is generally used to transmit traffic data. Accordingly, a BSR only for, for example, DTCH can be designed so as to decrease the complexity of the BSR. In this case, the sub-LCID may not be set. In another aspect, the sub-LCID may also be retained. The advantage of retaining the sub-LCID is being capable of keeping consistent with a structure of an existing BSR media access control control element (MAC CE). However, the present disclosure is not limited thereto. For example, the BSR may be directed to other required logical channels, for example, a control channel such as a common control channel (CCCH) and a dedicated control channel (DCCH), or other traffic channels evolving with the standards or in a communication standard other than LTE-A.

In another example, the above sub-logical channel ID may be substituted by a logical channel group ID (LCG ID) in the conventional technology, and the MAC CE carries information on a buffer size of low priority traffic of the entire logical channel group corresponding to the LCG ID rather than being limited to a specific logical channel. For example, the BSR has the following format.

| LCG ID (2 bits) | Buffer size of low priority traffic on a corresponding logical channel group (6 bits) |
|---|---|

In the above exemplary BSR format, the buffer size is indicated using six bits, which is the same as the existing standard. However, the present disclosure is not limited thereto, and a different data length may be used to indicate the buffer size according to requirements.

Further, according to an embodiment, the processor 110 (the generation unit 113) may further include, in the MAC CE, a BSR regarding the low priority traffic, and generate a subhead of an MAC protocol data unit corresponding to the MAC CE. The subhead may contain type information indicating that the MAC CE is the BSR regarding the low priority traffic.

More specifically, the type information may be indicated by a logical channel identification in the subhead, and an index value of the logical channel identification is one of binary values 01011 to 11000.

It is to be noted that, the subhead of the existing MAC protocol data unit for BSR may be multiplexed in some examples. For example, it is determined that the MAC CE is the BSR related to the low priority traffic based on a transmission relation between the BSR and the SR. For example, it can be determined that the BSR is related to the low priority traffic in a case that the BSR is transmitted immediately after the SR. For another example, type information on whether the MAC CE is the BSR related to the low priority traffic is carried by a load of the MAC CE. Specifically, the buffer size of the low priority traffic is generally smaller than the conventional buffer size of all traffic, it is therefore possible to be designed as that, for example, only five bits are used to indicate the buffer size and one bit is used to indicate whether the BSR is a BSR for low priority traffic of the LAA.

For example, the BSR has the following format:

| LCG ID (2 bits) | LAA BSR indication (1 bit) | Buffer size of low priority traffic of a corresponding LCG (5 bits) |
|---|---|---|

Additionally, according to an optional scheme, a UE may not transmit the SR but directly transmit the BSR, the base station may determine that the BSR is related to low priority traffic based on, for example, the subhead of the MAC packet data unit (PDU) or the above described 1-bit indication bit, and the request for resource scheduling is implied in transmission of the BSR. Therefore, the base station may perform resource scheduling based on the BSR directly.

Figure 16:
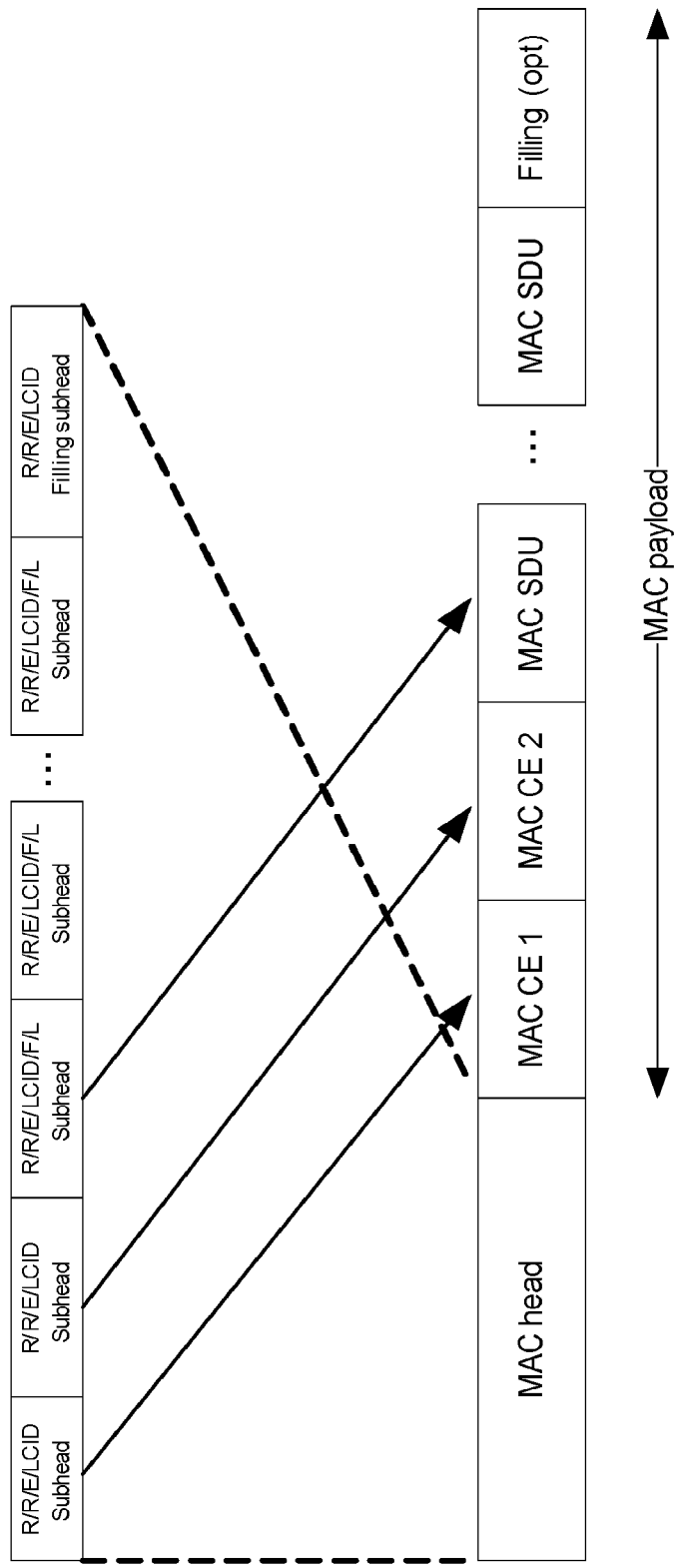
FIG. 16 illustrates a structure of a media access control packet data unit according to the conventional technology.

Next, structure of an MAC message (MCA PDU) according to existing standard is first described by referring to FIG. 16. As shown in FIG. 16, the MAC message includes an MAC head and an MAC payload. Specifically, as shown by the dashed line, the MAC head includes multiple subheads, and the MAC payload includes MAC CE/MAC service data unit (SDU)/filling. Each subhead of the MAC head indicates a payload in a corresponding position (as indicated sequentially by arrows in FIG. 16).

Figure 17:
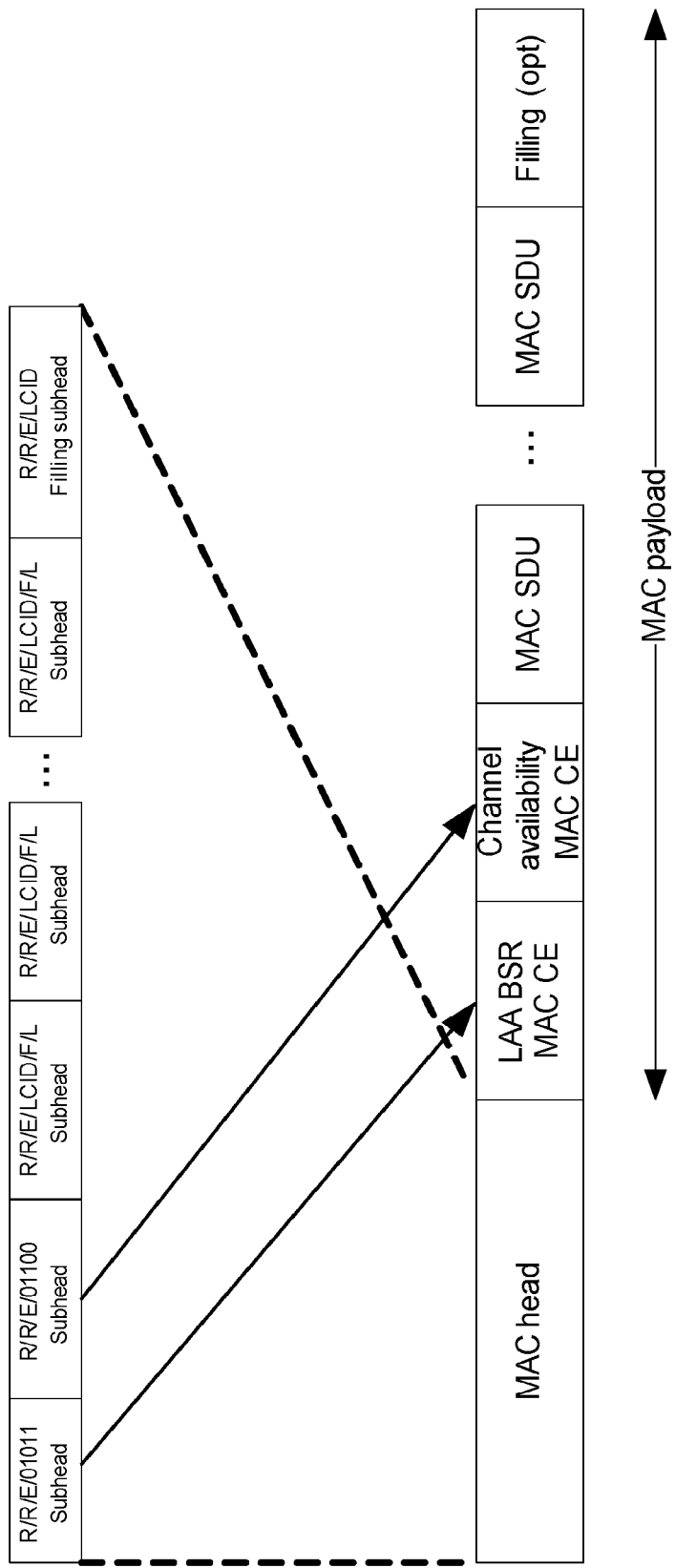
FIG. 17 illustrates an exemplary structure of a media access control packet data unit corresponding to an embodiment of the present disclosure.

FIG. 17 illustrates an exemplary structure of an MAC message corresponding to an exemplary embodiment. A structure of a subhead corresponding to the MAC CE of the LAA BSR is R/R/E/LCID (E: whether there are multiple fields, for example, whether there is a next group of R/R/E/LCID; R: reserved) including four fields. It is determined whether it is a subhead of the LAA BSR mainly based on the LCID (conventional) (the LCID may indicate the type of the MAC CE). For example, a value of the LCID in the MAC subhead of the LAA BSR according to the present disclosure is one of binary values 01011 to 11000 (for example, 01011, on which a consensus is reached between the UE and the BS). Since 01011 to 11000 are reserved bits of the LCID, the LAA BSR may be easily indicated without changing the standard. Additionally, as indicated by the arrows in FIG. 17, the subheads of MAC head indicate payloads in corresponding positions.

Correspondingly, FIG. 18 and FIG. 19 respectively illustrate an LCID value list for uplink shared channels according the existing standard and an LCID value list corresponding to the above exemplary embodiment according to the present disclosure. As can be seen by comparison, in this exemplary embodiment, 01011 in the reserved bits in the existing standard is used to indicate that the MAC CE is related to the LAA BSR, and 01100 is used to indicate that the MAC CE is related to channel availability. However, the index value of a corresponding logical channel identification may a value other than the binary values 01011 to 11000.

Additionally, there are the following triggering conditions for transmission timing of the above BSR:

(1) the BSR is transmitted after the LAA-SR is transmitted;

(2) transmitted when there is low QoS data to be transmitted in the DTCH;

(3) the BSR is transmitted when a timer for regularly transmitting the BSR expires, where the timer in the existing standard may be reused, or a timer may be newly defined.

Additionally, the BSR may be transmitted in a form of a short BSR, a truncated BSR, or even a long BSR.

In addition to the BSR information, other assistance information may further be transmitted after the LAA-SR so as to provide a decision basis to subsequent LAA resource assignment. The information may include, for example, geographical position information of the terminal, an idle condition of candidate channel in an unlicensed frequency band such as a 5G frequency band (the terminal needs to perform detection in a manner, for example, according to the conventional technology), and the like. A new MAC CE may be defined to transmit the geographical position information of the terminal.

For example, the CE of the idle condition of candidate channel in the 5G frequency band may have the following format.

| Channel Id (5 bits) | Whether available (1 bit) | Reversed (2 bits) |
|---|---|---|

First 5 bits identify a channel ID of the detected unlicensed frequency band, a subsequent 1 bit identifies whether the channel is available, and followed by 2 reserved bits for adding other information such as channel quality information.

For another example, the unlicensed frequency band may be divided into no more than 8 unlicensed channels in advance, for example, each channel corresponds to a preset frequency range, and an order is set for the candidate channels (the UE and the base station reach a consensus), and there is no need for a special indication for channel ID. Accordingly, the CE for indicating an idle condition of candidate channel may have the following format, for example.

| Whether CH1 is available (1 bit) | Whether CH2 is available (1 bit) | Whether CH3 is available (1 bit) | Whether CH4 is available (1 bit) | Whether CH5 is available (1 bit) | Whether CH6 is available (1 bit) | Whether CH7 is available (1 bit) | Whether CH8 is available (1 bit) |
| --- | --- | --- | --- | --- | --- | --- | --- |

Accordingly, the base station side may determine the idle condition of candidate channel in the unlicensed frequency band based on the MAC CE which indicates the availability of channel, and perform resource scheduling from transmission resources corresponding to the idle channels.

Similar to the subhead of the MAC CE of the LAA BSR, the subhead of the CE has a structure including four fields R/R/E/LCID, where the value of the LCID may be one of 01011 to 11000 (and is required to be different from the value of the LCID of the MACCE of the LAA BSR).

Although a case where the MAC PDU includes the LAA BSR is described in the above exemplary embodiment, in an example according to the present disclosure, one MAC PDU generated by the UE may include both the conventional BSR and the LAA BSR. Correspondingly, the base station may determine a resource scheduling scheme based on the conventional BSR in combination with the LAA BAR.

Next, a configuration example of an electronic device for wireless communication according to another embodiment is described with reference to FIG. 2.

Figure 2:
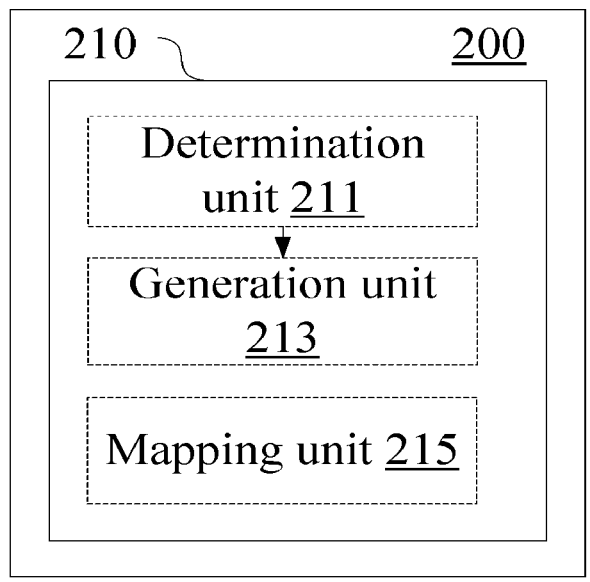
FIG. 2 is a block diagram illustrating a configuration example of an electronic device for wireless communication according to another embodiment.

As shown in FIG. 2, the electronic device 200 includes at least one processor 210. In addition to being configured to perform the functions described with reference to FIG. 1 (that is, the determination unit 211 and the generation unit 213 are similar to the determination unit 111 and the generation unit 113), the processor 210 is further configured to map, based on scheduling assignment information of the scheduler of the base station, data of the low priority traffic to a corresponding unlicensed transmission resource, for transmission to the base station.

The unlicensed transmission resource includes, for example, a transmission resource in a WiFi frequency band or a television (TV) frequency band. More specifically, data may be mapped to a PUSCH (Physical Uplink Shared Channel) resource (for example, a specific channel), a component carrier, a time-frequency resource block, a frequency band, a valid time period and the like, based on the scheduling assignment information.

Figure 3:
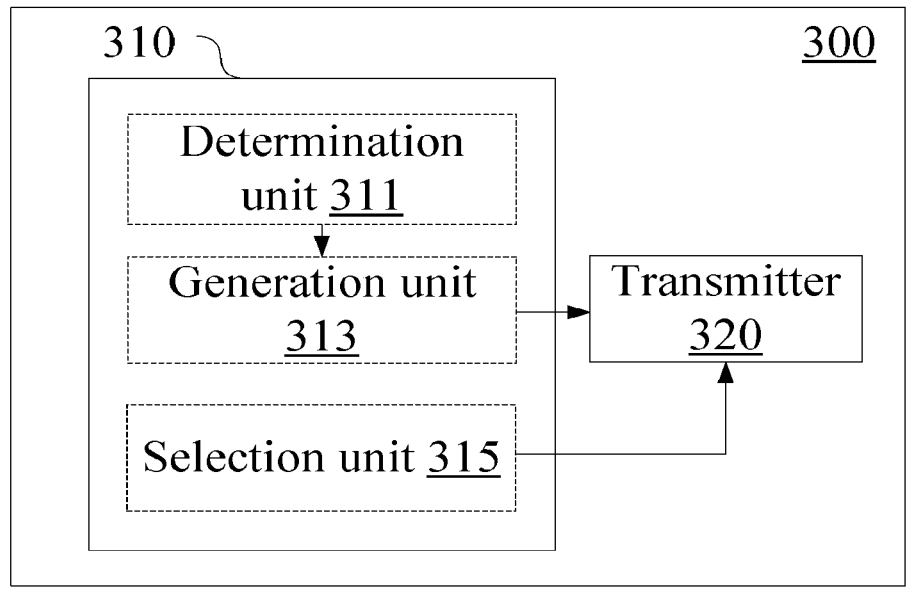
FIG. 3 is a block diagram illustrating a configuration example of a user equipment according to yet another embodiment.

Further, an electronic device for wireless communication according to an embodiment may be the user equipment itself. As shown in FIG. 3, the electronic device 300 according to this embodiment includes at least one processor 310 and a transmitter 320.

In addition to being configured to perform functions described with reference to FIG. 1 (that is, the determination unit 311 and the generation unit 313 are similar to the determination unit 111 and the generation unit 113), the processor 310 is further configured to select a transmission resource for transmitting the scheduling assistance information based on the availability of a transmission resource from the user equipment to the base station (the selection unit 315). For example, the transmission resource may be selected from the licensed frequency bands and the unlicensed frequency bands, or may be selected from a physical uplink control channel (PUCCH), a physical uplink shared channel (PUSCH) and a random access channel (RACH). Specifically, for example, in a case that the user equipment has been assigned with a data transmission resource such as a PUSCH resource, it is preferable to select a data transmission resource to carry the scheduling assistance information such as the BSR regarding the LAA; for example, in a case that the user equipment is configured with only a control information transmission resource such as a PUCCH resource, it can be determined that the scheduling assistance information such as the LAA-SR is carried by the control information transmission resource; in a case that the user equipment neither obtains the data transmission resource nor is configured with the control information transmission resource, it is determined that the authorization by the base station and the resource for an uplink transmission is obtained via a random access, for example, the scheduling assistance information regarding the LAA is transmitted via the RACH.

The transmitter 320 is configured to transmit the scheduling assistance information via the selected transmission resource.

In the description of the electronic devices for wireless communication in the embodiments above, it is apparent that some processing or methods are also disclosed. In the following, an overview of a method for wireless communication according to an embodiment of the present disclosure is given without repeating some details already discussed above.

Figure 4:
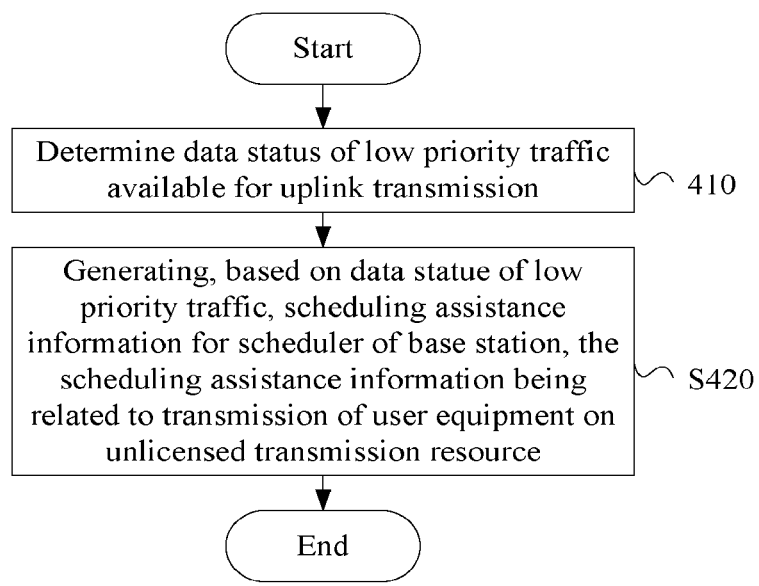
FIG. 4 is a flowchart illustrating a process example of a method for wireless communication according to an embodiment of the present disclosure.

As shown in FIG. 4, the method according to this embodiment includes a step of determining a data status of low priority traffic available for an uplink transmission (S410), and a step of generating, based on the data statue of the low priority traffic, scheduling assistance information for a scheduler of a base station (S420). The scheduling assistance information is related to a transmission of a user equipment on an unlicensed transmission resource.

The previously described embodiments are used for user equipment side to generate the scheduling assistance information to be provided to the base station. In addition, embodiments of the present disclosure further include devices and methods for base station side. Some details of the downlink data processing performed at base station side may be similar to or correspond to the details of user equipment side. Therefore, in the following description of the embodiments of the devices and methods on base station side, some details which are discussed above are omitted. It should be understood that these specific details are similarly applicable to the processing performed at base station side.

Figure 5:
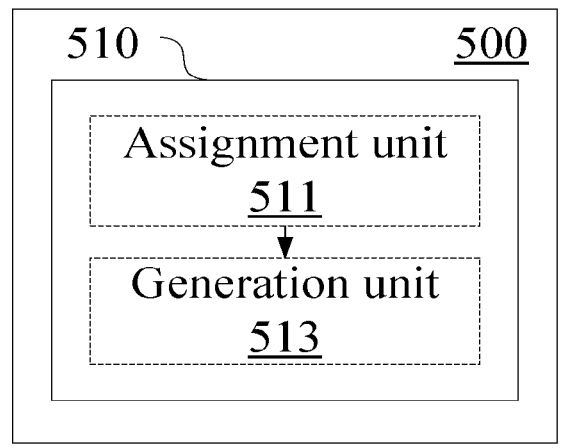
FIG. 5 is a block diagram illustrating a configuration example of an electronic device for wireless communication according to an embodiment of the present disclosure.

As shown in FIG. 5, an electronic device 500 for wireless communication according to an embodiment includes at least one processor 510.

The processor 510 is configured to assign an unlicensed transmission resource based on scheduling assistance information regarding low priority traffic from a user equipment (the assignment unit 511). The processor 510 is further configured to generate the scheduling assignment information regarding the unlicensed transmission resource for transmission of the user equipment (the generation unit 513).

More specifically, the scheduling assistance information may include a BSR. The processor 510 may read the BSR, determine a data volume of low priority traffic available for an uplink transmission in a buffer of the user equipment, and assign the unlicensed transmission resource based on the data volume.

Figure 6:
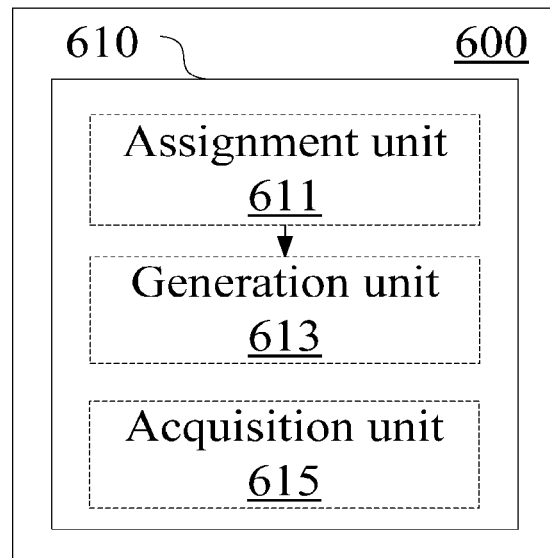
FIG. 6 is a block diagram illustrating a configuration example of an electronic device for wireless communication according to another embodiment.

FIG. 6 illustrates an electronic device for wireless communication according to another embodiment. An electronic device 600 includes at least one processor 610.

In addition to being configured to perform the functions described with reference to FIG. 5 in the above (that is, the assignment unit 611 and the generation unit 613 are similar to the assignment unit 511 and the generation unit 513), the processor 610 is further configured to acquire an MAC protocol data unit from the user equipment, and determine, based on a subhead of the MAC protocol data unit, that the MAC protocol data unit contains a MAC control element of a BSR regarding the low priority traffic so as to read the BSR (the acquisition unit 615). The subhead may contain type information indicating that the MAC control element is the BSR regarding the low priority traffic.

Specifically, the acquisition unit 615 may read the BSR in the exemplary manner described above with reference to FIG. 17 and FIG. 19, for example.

Figure 7:
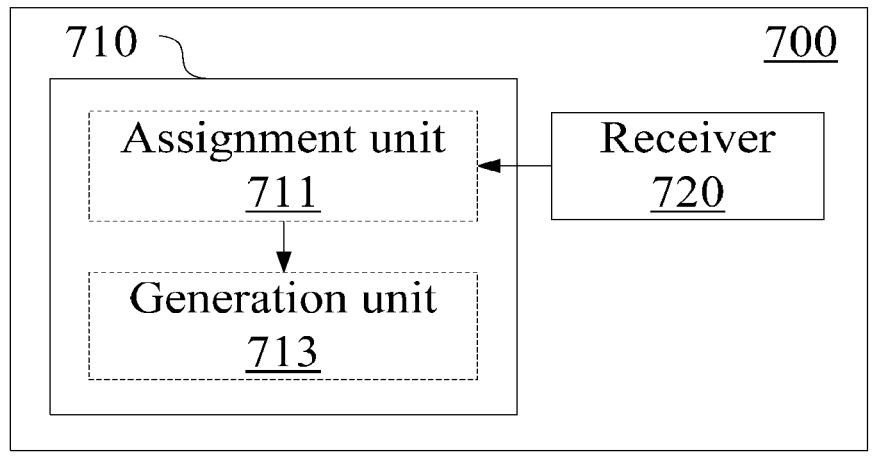
FIG. 7 is a block diagram illustrating a configuration example of a base station according to yet another embodiment.

According to an embodiment, the electronic device for wireless communication is a base station. As shown in FIG. 7, a base station 700 includes at least one processor 710 and a receiver 720.

The processor 710 may be configured to perform functions similar to the functions described above with reference to FIG. 5 (that is, the assignment unit 711 and the generation unit 713 are similar to the assignment unit 511 and the generation unit 513, respectively).

The receiver 720 is configured to receive scheduling assistance information from a user equipment or another base station serving the user equipment.

As described above, in a case that there is an uplink transmission in an LAA cell, the LAA-SR of the user equipment can represent a request for a corresponding uplink transmission resource of the LAA cell. In this case, the receiver 720 may receive the scheduling assistance information from the user equipment. In another aspect, in a case that there is no uplink transmission in the LAA cell, the transmission object of the LAA-SR of the user equipment is a primary cell. In this case, the receiver 720 may receive scheduling assistance information from another base station serving the user equipment. In a scenario of carrier aggregation, for example, the primary cell is a Pcell. In a scenario of dual link, for example, the primary cell is a Pcell or a PScell.

Next, examples of transmission processes in the above two cases are described with reference to FIG. 20 and FIG. 21.

Figure 20:
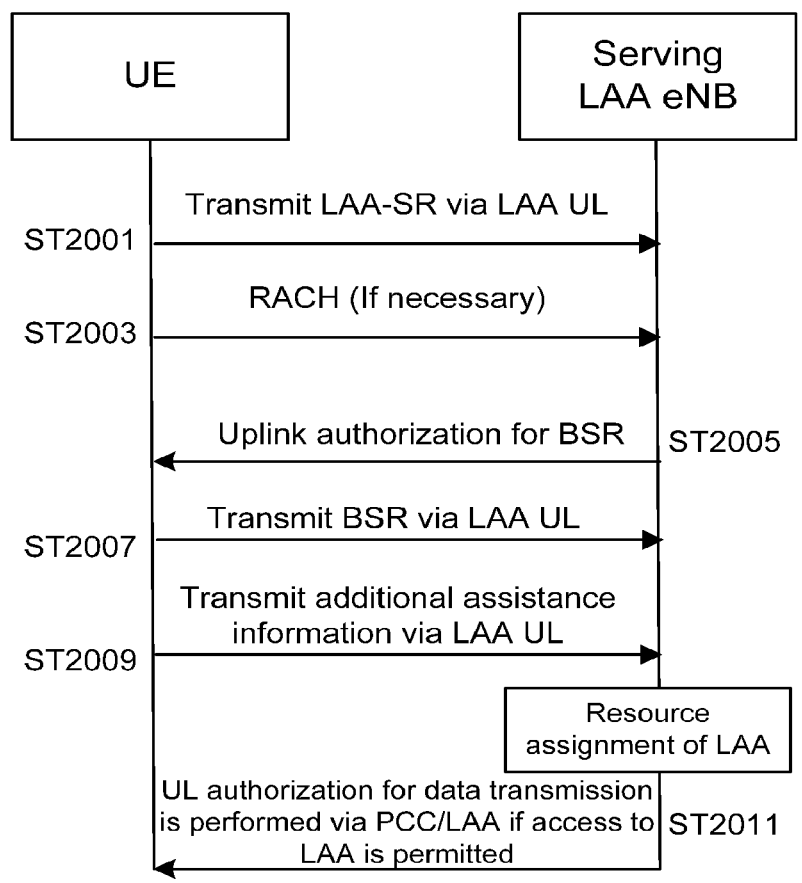
FIG. 20 illustrates an example of a scheduling request transmission process in an LAA scenario according to a specific embodiment.
Figure 21:
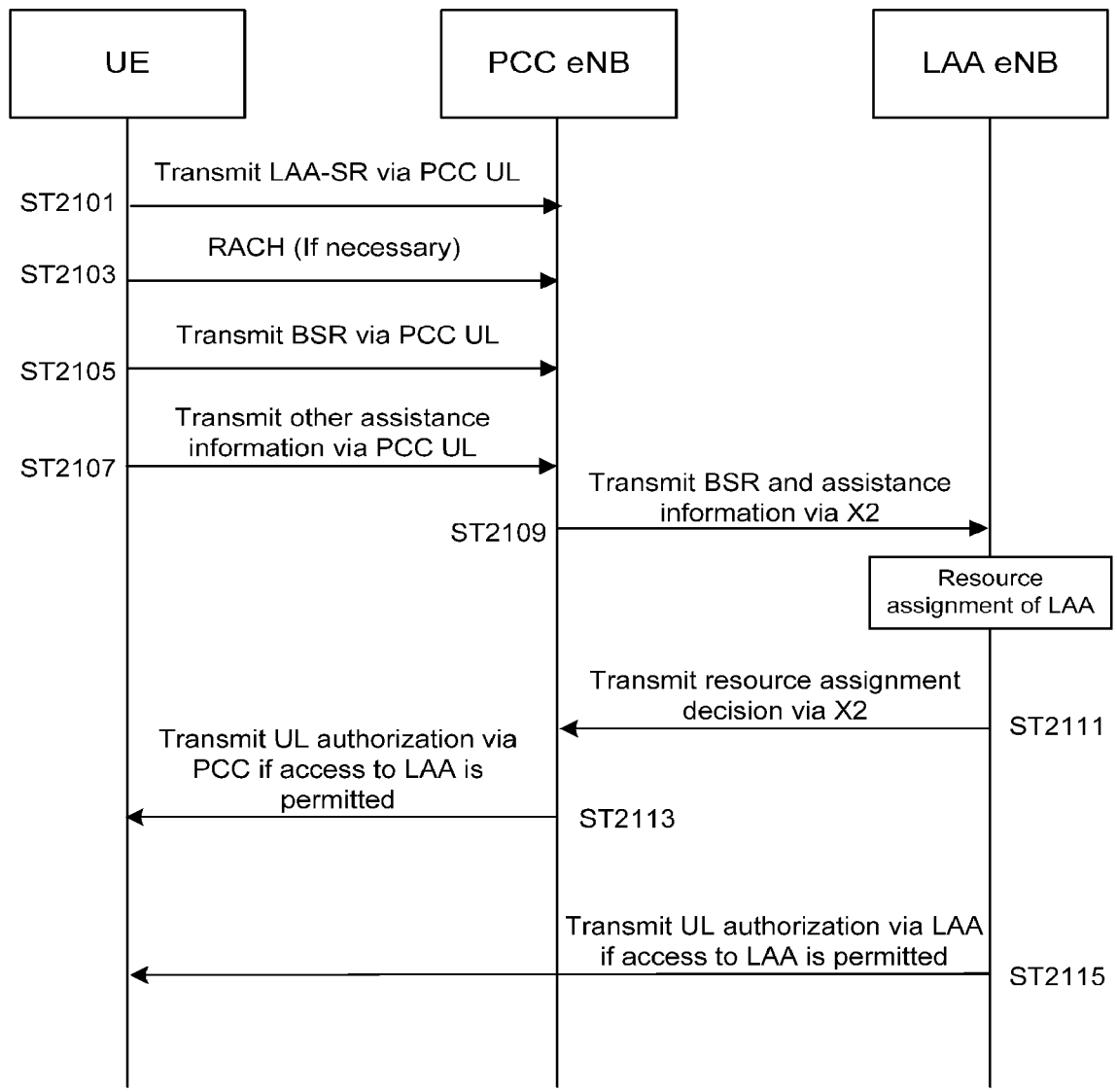
FIG. 21 illustrates another example of a scheduling request transmission process in an LAA scenario according to another specific embodiment.

As shown in FIG. 20, in a case that the LAA cell supports uplink transmission:

When UE side needs to request for the uplink transmission resource of the LAA, in ST2001, the UE transmits the SR via an uplink source of the LAA.

The UE side determines whether to transmit the SR directly via the PUCCH or initiate a new RACH process, based on whether there is a PUCCH resource for transmitting the SR or whether an upper limit of SR is reached (ST2003 is performed when necessary).

Subsequently, in ST2005, the LAA base station performs uplink authorization for the BSR to the UE.

Next, in ST2007, the UE transmits the BSR identifying low QoS traffic in the DTCH, and transmits other assistance information such as geographical position information in ST2009.

Upon reception of the information, the LAA base station determines whether to assign an LAA resource to the UE, based on an occupancy condition of the LAA resource, a volume of low priority traffic such as non-real time traffic of the UE and an interference condition obtained from information such as a geographical position. If it is determined to assign the transmission resource, the resource assignment information may be informed to the UE via the primary cell or LAA cell (ST2011). As shown in FIG. 21, in a case that the LAA cell does not support uplink transmission:

In ST2101 to ST2107, the UE side transmits the LAA-SR, the BSR and other assistance information to a base station of the primary cell using an uplink resource of the primary cell.

Upon reception of the information, the base station of the primary cell needs to generate X2 signaling containing the scheduling assistance information such as the LAA BSR of the UE and transfer the information to the LAA base station by the X2 signaling (ST2109) if the LAA base station is located in a different geographical position from the base station of the primary cell (for example, the LAA base station has an independent scheduler).

After making a decision of resource assignment, the LAA base station may inform the decision of resource assignment to the UE in two manners.

In a first manner, the decision of resource assignment is informed to the base station of the primary cell via X2 signaling (in a case that the LAA base station is located in a different geographical position from the base station of the primary cell) (ST2111), and then informed to the UE via the downlink control channel of the primary cell (ST2113).

In a second manner, the decision of resource assignment is directly informed to the UE via the downlink control channel of the LAA (ST2115).

Next, an overview of a wireless communication method for base station side according to an embodiment of the present disclosure is given without repeating some details already discussed above.

Figure 8:
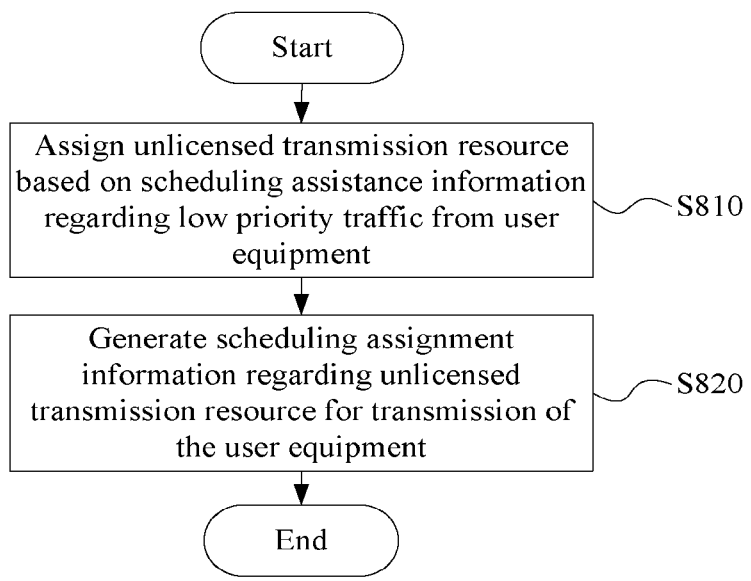
FIG. 8 is a flowchart illustrating a process example of a method for wireless communication according to an embodiment of the present disclosure.

As shown in FIG. 8, the method for wireless communication according to the embodiment includes a step of assigning an unlicensed transmission resource based on scheduling assistance information regarding low priority traffic from a user equipment (S810), and a step of generating scheduling assignment information regarding the unlicensed transmission resource for transmission of the user equipment (S820).

Next, a device and a method for terminal side of a wireless communication system, and a device and a method for base station side of a wireless communication system according to embodiments of the present disclosure are described with reference to FIG. 9 to FIG. 12. It is to be noted that, some specific details in above-described embodiments is also applicable to the following embodiments.

Figure 9:
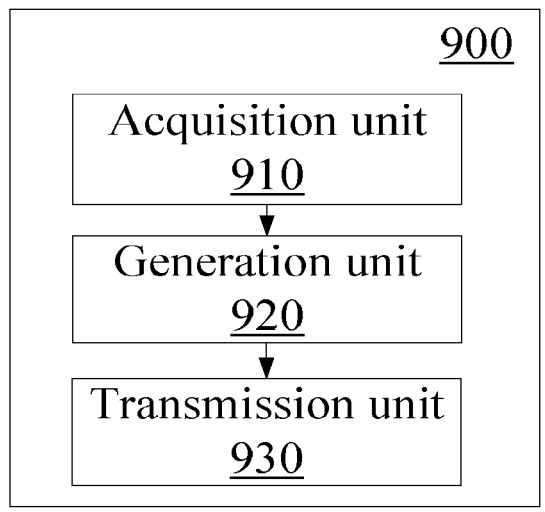
FIG. 9 is a block diagram illustrating a configuration example of a device for terminal side of a wireless communication system according to an embodiment of the present disclosure.

As shown in FIG. 9, a device 900 for terminal side of a wireless communication system according to an embodiment includes an acquisition unit 910, a generation unit 920 and a transmission unit 930. Functions of various units may be implemented by a processor, and are not necessarily implemented by discrete actual components. Additionally, the functions of various units may be distributed to multiple processors, so that the multiple processors cooperate to perform these functions. The device 900 may be used in wireless communication using an licensed frequency band.

The acquisition unit 910 is configured to acquire the data volume of low priority traffic to be transmitted in a buffer of a logical channel of the device 900. The logical channel may be a dedicated traffic channel.

The generation unit 920 is configured to include information regarding the data volume into a BSR.

The transmission unit 930 is configured to transmit the BSR to a base station.

According to an embodiment, the generation unit 920 is further configured to include information identifying the logical channel into the BSR.

More specifically, the generation unit 920 may be configured to indicate the BSR in a subhead of a media access control packet data unit (MAC PDU) carrying the BSR. For example, the BSR may be indicated using a logical channel identifier (LCID) field in the subhead.

Additionally, the generation unit 920 may be configured to add a field of specific bits in a control element (CE) of the MAC PDU carrying the BSR to indicate the BSR.

Further, the generation unit 920 may be configured to include the BSR regarding the low priority traffic in the MAC CE, and generate a subhead of an MAC protocol data unit corresponding to the MAC CE. The subhead contains type information indicating that the MAC control element is the BSR regarding the low priority traffic.

The transmission unit 930 may trigger transmission of the BSR under a predetermined triggering condition (for example, one of the several triggering conditions as described above). Further, the transmission unit 930 may further transmit other information, for example, geographical position information of the device and an idle condition of candidate channel in an unlicensed frequency band.

Figure 10:
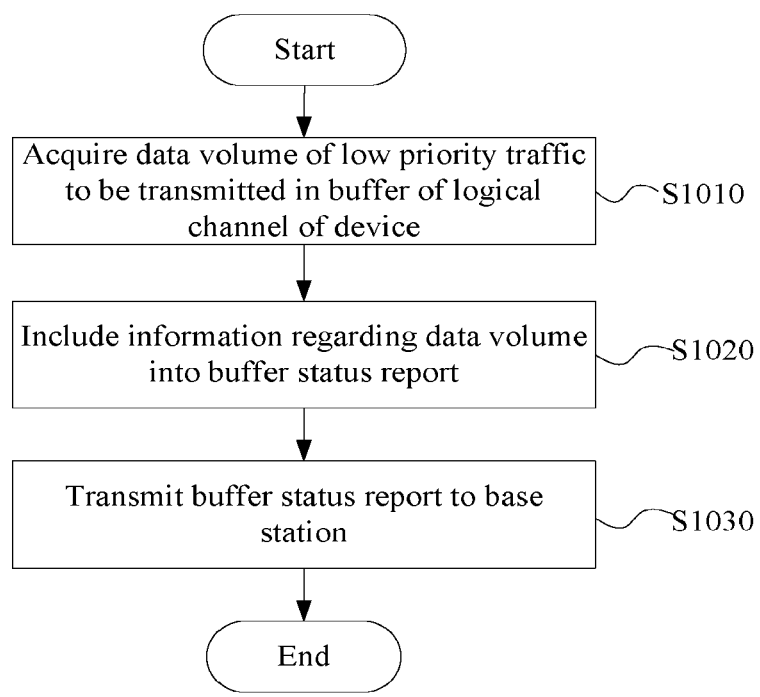
FIG. 10 is a flowchart illustrating a process example of a wireless communication method used by a device on terminal side according to an embodiment of the present disclosure.

As shown in FIG. 10, a wireless communication method used by a device on terminal side according to an embodiment includes a step of acquiring a data volume of low priority traffic to be transmitted in a buffer of a logical channel of a device (S1010), a step of including information regarding the data volume into a BSR (S1020), and a step of transmitting the BSR to the base station (S1030).

Figure 11:
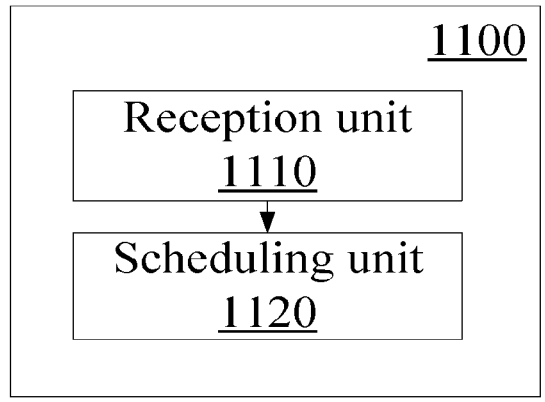
FIG. 11 is a block diagram illustrating a configuration example of a device for base station side of a wireless communication system according to an embodiment of the present disclosure.

As shown in FIG. 11, a device 1100 for base station side of a wireless communication system according to an embodiment includes a reception unit 1110 and a scheduling unit 1120.

The reception unit 1110 is configured to receive a BSR in which information regarding a data volume of low priority traffic to be transmitted on a logical channel of terminal side device is included. Further, the reception unit 1110 may further be configured to receive other information such as geographical position information and an idle condition of candidate channel in the unlicensed frequency band of the terminal side device.

The scheduling unit 1120 is configured to assign an uplink transmission resource to the terminal side device based on the information regarding the data volume. For example, the scheduling unit 1120 may assign an uplink transmission resource in an unlicensed frequency band for the terminal side device in response to the reception of the BSR. Further, in a case that the reception unit 1110 receives other information, the scheduling unit 1120 may perform an assignment using other information.

Figure 12:
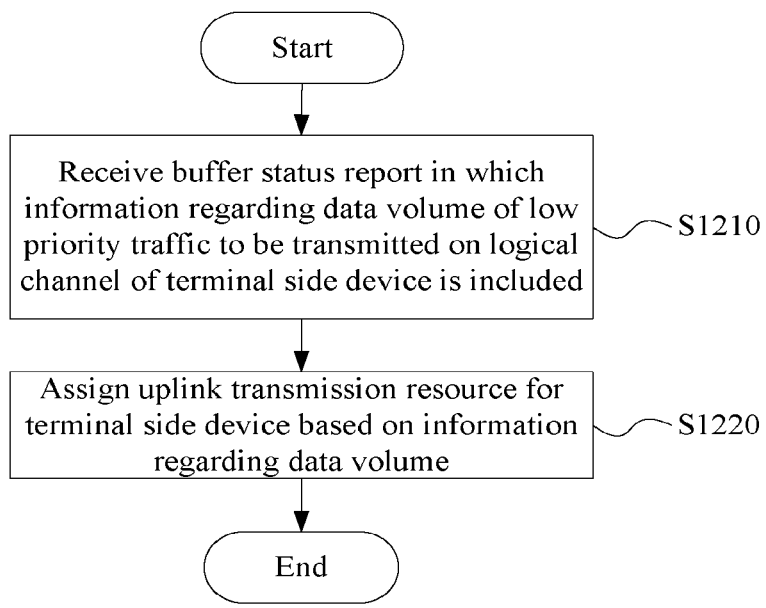
FIG. 12 is a flowchart illustrating a process example of a wireless communication method used by a device on base station side according to an embodiment of the present disclosure.

As shown in FIG. 12, a wireless communication method used by a device on base station side according to an embodiment includes a step of receiving a BSR in which information regarding a data volume of low priority traffic to be transmitted on a logical channel of terminal side device is included (S1210). The method further includes a step of assigning an uplink transmission resource for the terminal side device based on the information regarding the data volume (S1220).

As an example, the steps of the above-described methods and constituent modules and/or units of the above-described devices may be implemented as software, firmware, hardware, or a combination thereof. In the case that they are implemented as software or firmware, a program constituting the software for implementing the above-described methods may be installed from a storage medium or a network to a computer (for example, the general-purpose computer 1300 shown in FIG. 13) having a dedicated hardware structure. The computer can execute various functions when being installed with various programs.

Figure 13:
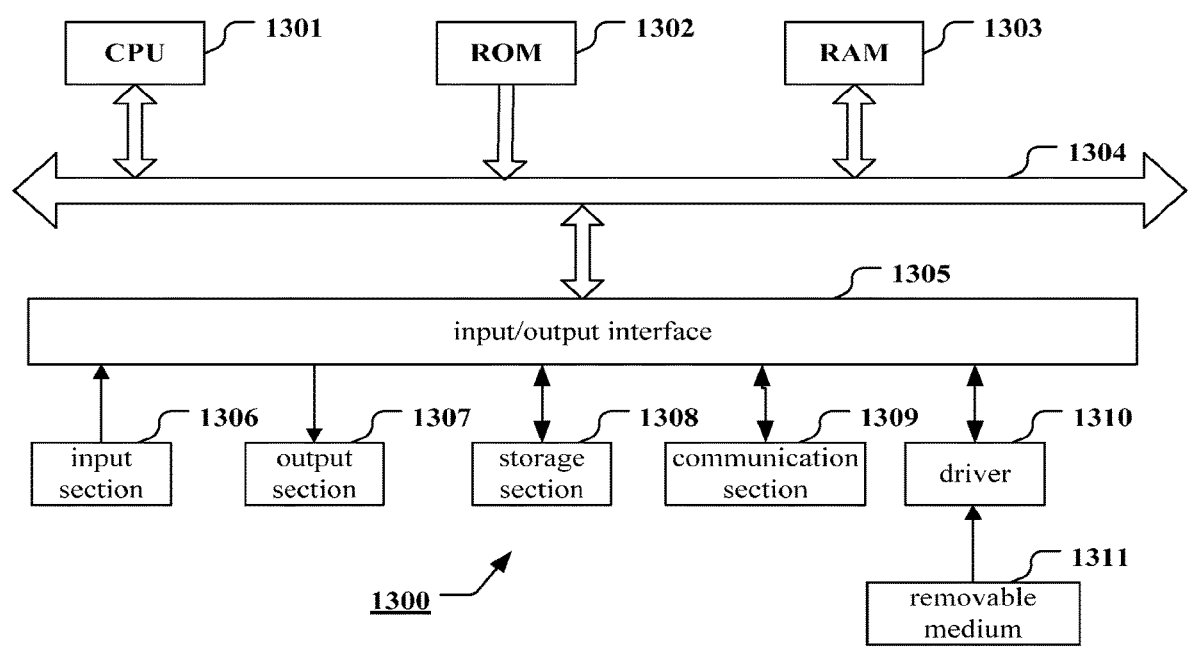
FIG. 13 is a block diagram illustrating an illustrative structure of a computer for implementing a method and a device according to the present disclosure.

In FIG. 13, a computing processing unit (i.e., CPU) 1301 executes various processing according to a program stored in a Read Only Memory (ROM) 1302 or a program loaded to a Random Access Memory (RAM) 1303 from a storage section 1308. In the RAM 1303, data required for the CPU 1301 in executing various processing and the like is also stored as necessary. The CPU 1301, the ROM 1302 and the RAM 1303 are connected to each other via a bus 1304. An input/output interface 1305 is also connected to the bus 1304.

The following components are linked to the input/output interface 1305: an input section 1306 including a keyboard, a mouse and the like, an output section 1307 including a display such as a Cathode Ray Tube (CRT) and a Liquid Crystal Display (LCD), a speaker and the like, the storage section 1308 including a hard disk and the like, and a communication section 1309 including a network interface card such as a LAN card, a modem and the like. The communication section 1309 performs communication processing via a network such as the Internet. If necessary, a driver 1310 may also be linked to the input/output interface 1305. A removable medium 1311 such as a magnetic disk, an optical disk, a magneto-optical disk, a semiconductor memory and the like is mounted on the driver 1310 as necessary such that a computer program read out therefrom is installed in the storage section 1308.

If the series of processing above is implemented by software, a program constituting the software is installed from the network such as the Internet or the storage medium such as the removable medium 1311.

It is understood by those skilled in the art that the storage medium is not limited to the removable medium 1311 shown in FIG. 13 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MID) (registered trademark), and a semiconductor memory. Alternatively, the storage medium may be the ROM 1302, a hard disk contained in the storage section 1308 or the like, in which the program is stored, and which is distributed to the user together with the device containing the storage medium.

Embodiments of the present disclosure further involve a program product having stored therein machine-readable instruction code. When the instruction code is read and executed by the machine, the above-described methods according to the embodiments of the present disclosure can be performed.

Correspondingly, the storage medium used for carrying the program product including machine-readable instructions is also included in the present disclosure. The storage medium includes but not limited to, a floppy diskette, an optical disk, a magneto-optical disk, a memory card, a memory stick and so on.

The embodiments of the present disclosure further relate to the following electronic device. In a case that the electronic device is used for base station side, the base station may be implemented as any type of evolved node B (eNB), such as a macro eNB and a small eNB. The small eNB may be an eNB which covers a cell smaller than a macro cell, such as a pico eNB, a micro eNB and a home (femto) eNB. Alternatively, the electronic device may be implemented as any other type of base station, such as a Node B and a base transceiver station (BTS). The electronic device may include: a main body (also referred to as a base station device) configured to control the wireless communication, and one or more remote radio heads (RRH) provided at a different site from the main body. Further, various types of terminals to be described hereinafter may serve as a base station by performing the function of the base station temporarily or semi-permanently. Further, the electronic device on base station side may also be a processing chip instead of an eNB entirety.

In a case that the electronic device is used for user equipment side, the electronic device may be implemented as a mobile terminal (such as an smartphone, a tablet personal computer (PC), a notebook PC, a portable game terminal, a portable/dongle mobile router and a digital camera device) or an on-board terminal (such as a car navigation device). Further, the electronic device may be a wireless communication module mounted on each of the above terminals (such as the integrated circuit module including a single chip or multiple chips).

[Application Example Regarding a Terminal Device]

Figure 14:
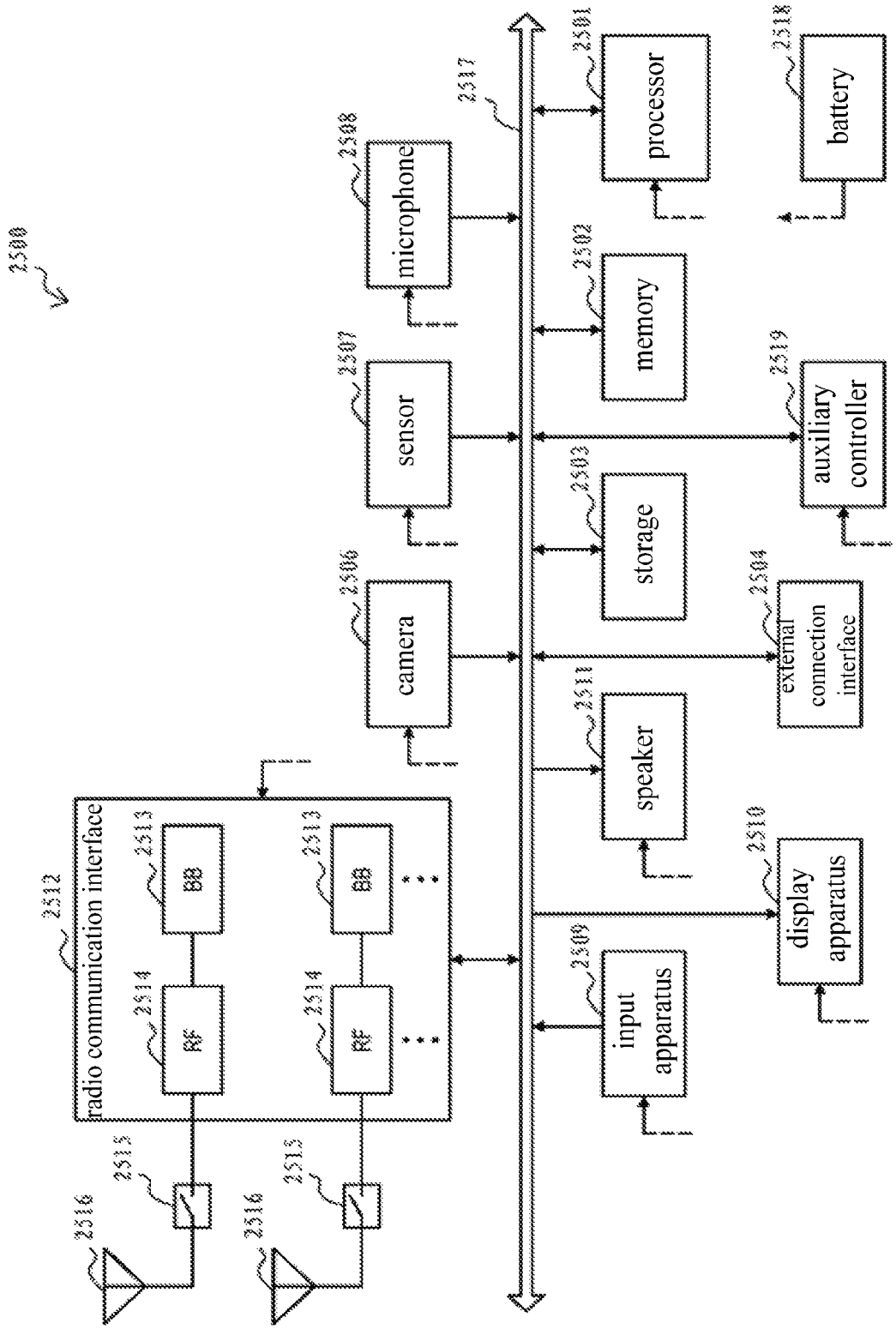
FIG. 14 is a block diagram illustrating an example of a schematic configuration of a smartphone to which the technology of the present disclosure is applicable.

FIG. 14 is a block diagram illustrating an example of a schematic configuration of a smartphone 2500 to which the technology according to the present disclosure is applicable. The smartphone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes RAM and ROM, and stores a program that is executed by the processor 2501 and data. The storage 2503 may include a storage medium such as a semiconductor memory and a hard disk. The external connection interface 2504 is an interface for connecting an external device (such as a memory card and a universal serial bus (USB) device) to the smartphone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smartphone 2500 to audio signals. The input apparatus 2509 includes, for example, a touch sensor configured to detect touch on a screen of the display apparatus 2510, a keypad, a keyboard, a button, or a switch, and receives an operation or information inputted from a user. The display apparatus 2510 includes a screen (such as a liquid crystal display (LCD) and an organic light-emitting diode (OLED) display), and displays an output image of the smartphone 2500. The speaker 2511 converts audio signals that are outputted from the smartphone 2500 into sounds.

The radio communication interface 2512 supports any cellular communication scheme (such as LET and LTE-Advanced), and performs wireless communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and performs various types of signal processing for wireless communication. Meanwhile, the RF circuit 2514 may include, for example, a mixer, a filter, and an amplifier, and transmits and receives wireless signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 14. Although FIG. 13 illustrates the example in which the radio communication interface 2512 includes multiple BB processors 2513 and multiple RF circuits 2514, the radio communication interface 2512 may also include a single BB processor 2513 or a single RF circuit 2514.

Furthermore, in addition to a cellular communication scheme, the radio communication interface 2512 may support another type of wireless communication scheme such as a short-distance wireless communication scheme, a near field communication scheme, and a radio local area network (LAN) scheme. In that case, the radio communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smartphone 2500 may include the multiple antennas 2516, as illustrated in FIG. 14. Although FIG. 14 illustrates the example in which the smartphone 2500 includes multiple antennas 2516, the smartphone 2500 may also include a single antenna 2516.

Furthermore, the smartphone 2500 may include the antenna 2516 for each wireless communication scheme. In that case, the antenna switches 1215 may be omitted from the configuration of the smartphone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smartphone 2500 illustrated in FIG. 14 via feeder lines, which are partially shown as dashed lines in the drawing. The auxiliary controller 2519 operates a minimum necessary function of the smartphone 2500, for example, in a sleep mode.

In the smartphone 2500 illustrated in FIG. 14, the communication unit 320 described with reference to FIG. 3 and the transmitting unit 930 described with reference to FIG. 9 may be implemented by the radio communication interface 2512. At least a part of the functions of the processor and the units described with reference to FIG. 1 to FIG. 3 and FIG. 9 may also be implemented by the processor 2501 or the auxiliary controller 2519. For example, power consumption of the battery 2518 may be reduced by performing a part of functions of the processor 2502 by the auxiliary controller 2519. Further, the processor 2501 or the auxiliary controller 2519 may execute at least a part of functions of the processor and the units described with reference to FIG. 1 to FIG. 3 and FIG. 9 by executing the program stored in the memory 2502 or the storage 2503.

[Application Example Regarding a Base Station]

Figure 15:
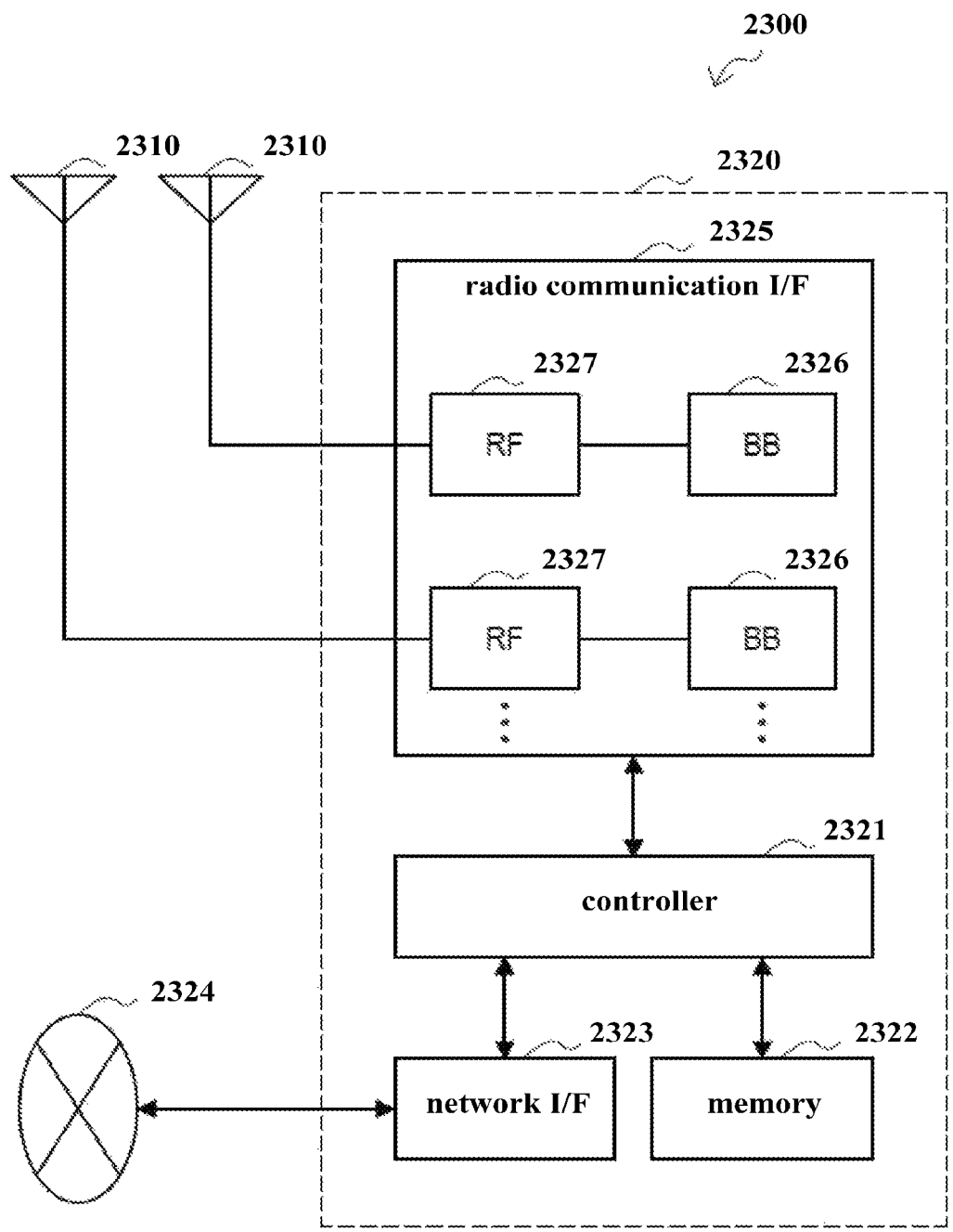
FIG. 15 is a block diagram illustrating an example of a schematic configuration of a eNB (evolved base station) to which the technology of the present disclosure is applicable.

FIG. 15 is a block diagram illustrating a first example of a schematic configuration of an eNB to which the technology according to the present disclosure is applicable. An eNB 2300 includes one or more antennas 2310 and a base station device 2320. The base station device 2320 and each antenna 2310 may be connected with each other via RF cable.

Each of the antennas 2310 includes one or more antenna elements (such as the multiple antenna elements included in the multiple-input multiple-output (MIMO) antenna), and is used for transmitting and receiving the radio signal by the base station device 2320. As show in FIG. 15, the eNB 2300 may include multiple antennas 2310. For example, the multiple antennas 2310 may be compatible with the multiple frequency bands used by the eNB 2300. Although FIG. 15 shows an example in which the eNB 2300 includes multiple antennas 2310, the eNB 2300 may also include a single antenna 2310.

The base station device 2320 includes a controller 2321, a memory 2322, a network interface 2323 and a radio communication interface 2325.

For example, the controller 2321 may be a CPU or DSP, and performs various functions of higher layers of the base station device 2320. For example, the controller 2321 generates a data packet based on the data in the signal processed by the radio communication interface 2325, and transfers the generated packet via the network interface 2323. The controller 2321 may bundle data from multiple baseband processors to generate bundled packet, and transfers the generated bundled packet. The controller 2321 may have logical function to perform the control such as radio resource control, radio bearer control, mobility management, admission control and scheduling. The control may be performed in conjunction with the neighboring eNB or a core network node. The memory 2322 includes RAM and ROM, and stores the program to be performed by the controller 2321 and various types of control data (such as a terminal list, transmission power data and scheduling data).

The network interface 2323 is a communication interface for connecting the base station device 2320 to the core network 2324. The controller 2321 may communicate with the core network node or another eNB via the network interface 2323. In this case, the eNB 2300 and the core network node or another eNB may be connected with each other via a logic interface (such as S1 interface and X2 interface). The network interface 2323 may also be a wired communication interface or a wireless communication interface for wireless backhaul routing. If the network interface 2323 is a radio communication interface, the network interface 2323 may use a higher frequency band for wireless communication as compared with that used by the radio communication interface 2325.

The radio communication interface 2325 supports any cellular communication scheme (such as the long term evolution (LTE) and the LTE-Advanced), and provides a wireless connection to a terminal located in the cell of the eNB 2300 via the antenna 2310. The radio communication interface 2325 may generally include for example a base band (BB) processor 2326 and a RF circuit 2327. The BB processor 2326 may perform for example encoding/decoding, modulation/demodulation and multiplexing/de-multiplexing, and performs various types of signal processes of the layer (for example L1, media access control (MAC), radio link control (RLC) and packet data convergence protocol (PDCP)). In place of the controller 2321, the BB processor 2326 may have some or all of the above logical functions. The BB processor 2326 may be a memory storing the communication control program, or a module including a processor and related circuit configured to perform the program. An updating program may change the function of the BB processor 2326. The module may be a card or blade included into the slot of the base station device 2320. Alternatively, the module may be a chip mounted on the card or the blade. Meanwhile, the RF circuit 2327 may include for example a mixer, a filter and an amplifier, and transmit and receive a wireless signal via the antenna 2310.

As shown in FIG. 15, the radio communication interface 2325 may include multiple BB processors 2326. For example, the multiple BB processors 2326 may be compatible with the multiple frequency bands used by the eNB 2300. As shown in FIG. 15, the radio communication interface 2325 may include multiple RF circuits 2327. For example, the multiple RF circuits 2327 may be compatible with multiple antenna elements. Although an example in which the radio communication interface 2325 includes multiple BB processors 2326 and multiple RF circuits 2327 is shown in FIG. 15, the radio communication interface 2325 may include a single BB processor 2326 and a single RF circuit 2327.

In the eNB 2300 illustrated in FIG. 15, the transceiver 720 described with reference to FIG. 7 and the reception unit 1110 described with reference to FIG. 11 may be implemented by the radio communication interface 2325. At least a part of the functions of the processor described with reference to FIG. 5 to FIG. 7 and FIG. 11 and the units may also be implemented by the controller 2321. For example, the controller 2321 may execute at least a part of functions of the processor and the units described by using FIG. 5 to FIG. 7 and FIG. 11 by executing the program stored in the memory 2322.

In the above description of specific embodiments of the present disclosure, the features described and/or illustrated with respect to one embodiment may be used in one or more other embodiments in the same or similar manner as or to that in the embodiment, in combination with features in other embodiments, or replacing features in other embodiments.

It is to be emphasized that the term "comprising/including" as used herein refers to the presence of a feature, element, step or component but does not exclude the presence or addition of one or more other features, elements, steps or components.

In the above embodiments and examples, reference numbers consist of numbers are used to represent each step and/or unit. It will be understood by those skilled in the art that these reference numbers are used for convenience of description and illustration only and are not intended to represent order or any other limit thereof.

In addition, the method of the present disclosure is not limited to be performed in a chronological order described in the specification, but may also be performed in other time-sequentially, in parallel, or independently. Therefore, the order of execution of the methods described in this specification does not limit the technical scope of the present d.

Although the disclosure has been described above with respect to specific embodiments thereof, it is to be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents are intended to be included within the scope of protection of the present disclosure.

The invention claimed is:

1. An electronic device for wireless communication, comprising:
at least one processor configured to
determine a data status of low priority traffic available for a cellular uplink transmission; and
generate, based on the data status of the low priority traffic, a buffer status report for a scheduler of a base station, the buffer status report being related to a cellular uplink transmission of a user equipment on an unlicensed carrier which aggregates with a licensed carrier for Licensed-Assisted-Access (LAA) cellular transmission, wherein
the at least one processor is further configured to include, in the buffer status report, identification information of a logical channel and/or a logical channel group in the cellular uplink transmission to which the low priority traffic belongs, the logical channel comprising a dedicated traffic channel,
the at least one processor is configured to determine a data volume of low priority traffic available for an uplink transmission in a buffer, and include, in the buffer status report, indication information of the data volume of the low priority traffic, the indication information including a size of a buffer of the low priority traffic without including a size of a buffer of high priority traffic, the buffer status report being used by the base station for determining whether to assign an LAA resource to the electronic device.

2. The electronic device according to claim 1, wherein the at least one processor is further configured to include, in a media access control MAC control element, the buffer status report regarding the low priority traffic, and generate a subhead of a MAC protocol data unit corresponding to the MAC control element, the subhead containing type information indicating that the MAC control element is the buffer status report regarding low priority traffic.

3. The electronic device according to claim 1, wherein the low priority traffic comprises traffic with a low requirement on quality of service.

4. The electronic device according to claim 1, wherein the at least one processor is further configured to map, based on scheduling assignment information of the scheduler of the base station, data of the low priority traffic to a corresponding unlicensed transmission resource, for transmitting to the base station.

5. The electronic device according to claim 1, wherein the at least one processor is further configured to generate at least one of: geographical position information of the user equipment, an idle condition of a candidate channel on an unlicensed transmission resource, and a channel quality of a candidate channel on the unlicensed transmission resource for the scheduler of the base station.

6. The electronic device according to claim 1, wherein the electronic device is another user equipment, the at least one processor is further configured to select a transmission resource for transmitting scheduling assistance information based on availability of a transmission resource from the another user equipment to the base station, and the electronic device further comprises a transmitter configured to transmit the scheduling assistance information via the selected transmission resource.

7. The electronic device according to claim 1, further comprising a transmitter configured to transmit scheduling assistance information with one of the following cases as a triggering condition:
a) a resource request for requesting an uplink channel resource in an unlicensed frequency band has been transmitted by the electronic device;
b) there is low priority traffic data to be transmitted in the corresponding channel; and
c) a timer for regularly performing the transmission expires.

8. A method for wireless communication, comprising:
determining a data status of low priority traffic available for a cellular uplink transmission; and
generating, based on the data status of the low priority traffic, a buffer status report for a scheduler of a base station, the buffer status report being related to a cellular uplink transmission of a user equipment on an unlicensed carrier which aggregates with a licensed carrier for Licensed-Assisted-Access (LAA) cellular transmission, wherein
the buffer status report includes identification information of a logical channel and/or a logical channel group in the cellular uplink transmission to which the low priority traffic belongs, the logical channel comprising a dedicated traffic channel,
the buffer status report is included in scheduling assistance information, and the method comprises determining a data volume of low priority traffic available for an uplink transmission in a buffer, and including, in the buffer status report, indication information of the data volume of the low priority traffic, the indication information including a size of a buffer of the low priority traffic without including a size of a buffer of high priority traffic, the buffer status report being used by the base station for determining whether to assign an LAA resource to an electronic device.

9. The method according to claim 8, further comprising including, in a media access control MAC control element, the buffer status report regarding the low priority traffic, and generating a subhead of a MAC protocol data unit corresponding to the MAC control element, the subhead containing type information indicating that the MAC control element is a buffer status report regarding low priority traffic.

10. The method according to claim 8, wherein the low priority traffic comprises traffic with a low requirement on quality of service.

11. The method according to claim 8, further comprising mapping, based on scheduling assignment information of the scheduler of the base station, data of the low priority traffic to a corresponding unlicensed transmission resource, for transmitting to the base station.

12. The method according to claim 8, wherein the generating includes generating at least one of: geographical position information of the user equipment, an idle condition of a candidate channel on an unlicensed transmission resource, and a channel quality of a candidate channel on the unlicensed transmission resource.

* * * * *